United States Patent [19]

Fantigrossi

[11] Patent Number: 5,108,136
[45] Date of Patent: Apr. 28, 1992

[54] PIPE INTERSECTOR FITTINGS

[76] Inventor: Frank Fantigrossi, 14 Ellen Dr., Port Jefferson, N.Y. 11777

[21] Appl. No.: 482,502

[22] Filed: Feb. 21, 1990

[51] Int. Cl.⁵ .............................................. F16L 55/00
[52] U.S. Cl. .................................. 285/176; 265/188; 138/DIG. 11; 403/346
[58] Field of Search ................. 285/176, 188; 138/177, 138/DIG. 11, 178; 403/346, 282, 382, 170; 52/668

[56] References Cited

U.S. PATENT DOCUMENTS 2,397,655 4/1946 Francis ................................ 285/176
3,927,950 12/1975 Herrmann et al. ................... 403/346

Primary Examiner—Dave W. Arola

[57] ABSTRACT

Pipe fittings that allow pipes to intersect each other without communication, and without extending one pipe over and around the second one. The use of these fittings allow installation of intersecting pipes in two dimensions. The angle of intersection can be varied up to 90 degrees, or perpendicular. The use of these fittings save material expense, labor expense, time and space, and improve pressure loss compared to current methods of piping.

2 Claims, 1 Drawing Sheet

PIPE INTERSECTOR FITTINGS

BACKGROUND OF THE INVENTION

This invention relates to pipe fittings, and is concerned directly with fittings that allow two intersecting pipes to cross in such a way so that one pipe does not need to be directed around the second pipe. In essence the two intersecting pipes pass each other without the need to leave the plane that the two pipes form. The design of the fitting is such that the pipes can pass by each other in the same plane without interconnecting, or intercommunicating. The use of these fittings in cases where pipes must cross paths saves labor expense because about half the connections as in present methods are needed. The use of the fittings saves material since only half the number of fittings are needed as compared to present methods. Using these fittings. Intersecting pipes can be installed without the pipes leaving the plane formed by the two pipes, thereby saving significant space as compared to present methods where one pipe must go around the other pipe. Using these fittings, the pressure drop experienced by fluids is an insignificant percent of the pressure drop using present methods, thereby improving the pressure loss in fluids in the pipe system as compared to present methods and fittings.

The design of the fittings is such that the fittings consists of an opening at each end of appropriate size to accept the pipe, and a middle section which is approximately half the height of the openings, but of equal cross sectional area as the openings. Two fittings can thus be adjoined in such a way that the longitudinal line from one opening of the fitting to the other end of the fitting will be at some angle up to 90 degrees to the longitudinal line formed from opening to opening of the second fitting. The total thickness of the combined adjoined fittings is equal to the diameter of the openings. It is also possible to adjoin fittings of different sizes. In such cases the overall thickness of the adjoined fittings will be less than the diameter of the opening of the larger fitting.

These and other features and advantages of the present invention will become apparent upon consideration of the following specification when taken in conjunction with the accompanying drawings.

Description of the Drawings

To the accomplishment of the above and related objects this invention may be embodied in the form illustrated in the accompanying drawings, attention being called to the fact that the drawings are only illustrative, and changes may be made in the specific construction and design illustrated and described within the scope of the appended claims without changing the intention of this invention. Note that making the fittings out of different material such as copper, cast iron, or plastic for example, and requiring that the fitting mate with current pipes of such material will dictate the exact dimensions, and precise shape, while not altering the intention of this invention.

Located between ends, 11 and 12, is a flattened region 13. This region 13 has a top surface 14 and a bottom surface 15 which determine the thickness of region 13. In addition, region 13 has edges, 19 and 20, which define the width of region 13.

Figure 1:
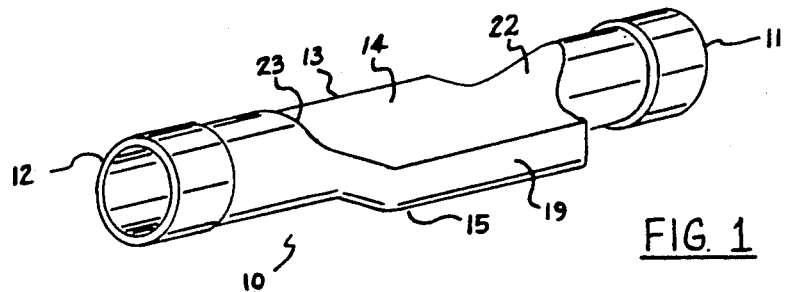
FIG. 1—perspective view showing the device
FIG. 2—side view of the device
FIG. 3—end view of the device
FIG. 4—top view showing two devices crossing
FIG. 5—side view showing two devices crossing
FIG. 6—top view showing two devices crossing at an angle Referring now to the drawings in detail the numeral 10 represents the device or fitting. The fitting is comprised of two ends, 11 and 12, of equal cross sectional area, meant to receive a connecting pipe of appropriate size. Ends, 11 and 12, can vary in length to allow connecting pipes to be threaded, welded, or soldered to device 10.
Figure 2:
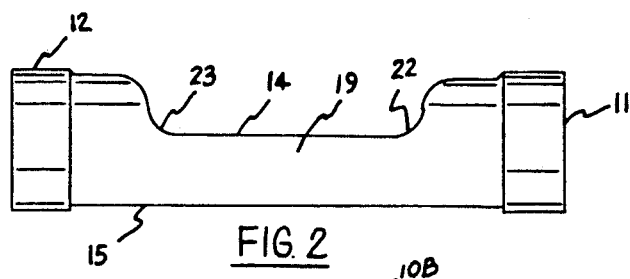

By observing FIG. 2, a side view of device 10 is seen. The distance from top surface 14 to bottom surface 15 on region 13 is equivalent to on half the diameter of opening 11 or 12.

Figure 3:
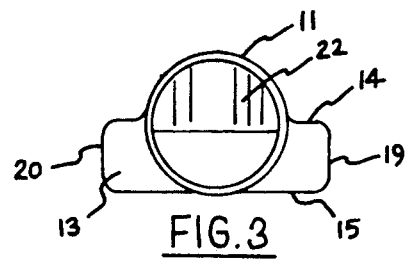

By observing FIG. 3, an end view of device 10 is seen. The distance from the two edges of flattened region 13, 19 and 20, varies dependent on the specific parameters of the fitting, in such a way that the cross sectional area of opening 11 or 12 is equal to the cross sectional area of region 13. Since the distance from surface 14 to surface 15 must be equal to the radius of opening 11 or 12, the distance from edge 19 to edge 20 must equal PI (3.14) times the radius of opening 11 or 12. By maintaining region 13 at the same or greater cross sectional area of the opening 11 or 12, the friction loss in fluids passing through the device 10 will be significantly lower than alternate or present methods of assembly.

Figure 6:
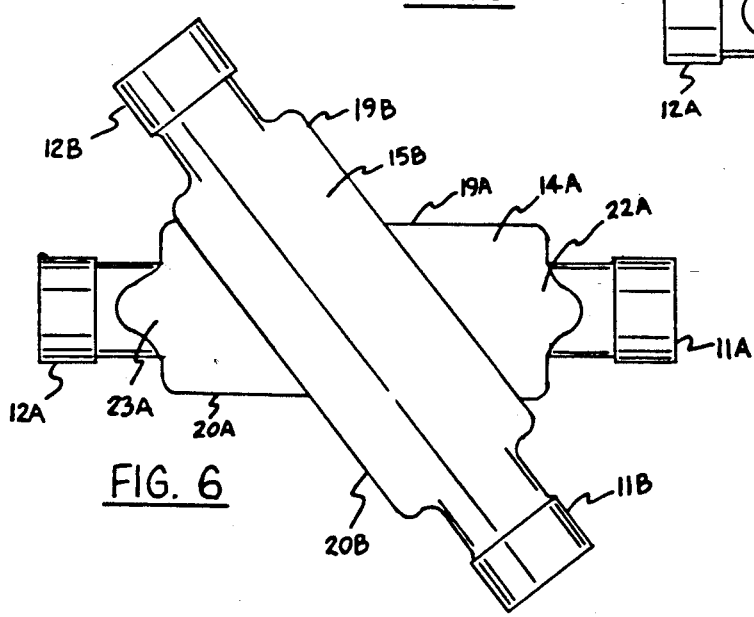

The length of region 13, from the transition point 22 of opening 11 to transistion point 23 of opening 12, can vary. If this distance is set to a length equal to the width of region 13, then two devices 10 assembled as in FIG. 4, will intercept at a 90 degree angle. If the length of region 13 exceeds the width of region 13, two devices 10 can be installed as in FIG. 4, but at angles varying from 90 degrees, as seen in FIG. 6.

Figure 5:
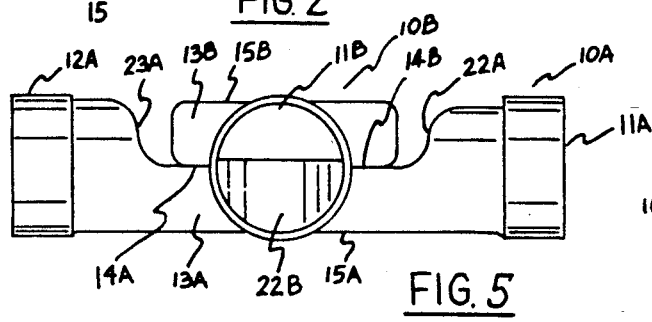
Figure 4:
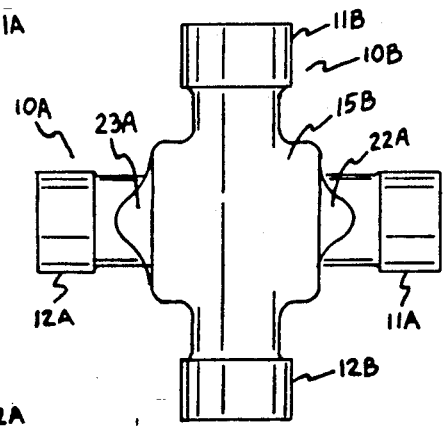

FIG. 5 illustrates the side view of two devices 10A and 10B depicted in FIG. 4. It is seen here that the total thickness of region 13A and 13B is equivalent to the diameter of opening 11A and 11B.

The ends 11 and 12 can be any type of connector, such as smooth, male threaded, female threaded. Adapting the ends to allow use in different connections does not alter the nature of the invention.

In some cases it may be advantageous to limit heat transfer between intersecting fittings. Hence a thin heat insulating material equal to the size of surface 14 may be placed on the top surface 14 of the flattened region 13 to limit heat transfer when two fittings are adjoined.

This device 10 can be constructed of different materials, such as copper, bronze, steel, iron, plastic, and can be constructed in different sizes to accomodate current pipe systems, such as ¾ inch, 1 inch, 1½ inch, 3 inch, or 6 inch, for example.

It is also possible to have pipes of different sizes intersect with approriate fittings. In these cases the thickness of the adjoined fittings will be less than the diameter of the larger fitting opening still providing all the benefits of the invention.

While this invention has been described in detail with particular reference to the preferred embodiments thereof, it will be understood that variations and modifications can be effected without departing from the spirit and scope of the invention as described hereinbefore and as defined in the appended claims.

What I claim:

1. A pipe fitting with two ends, circular in cross section for connecting to a pipe system, said ends being separated by a flattened region having a thickness equal to one half the diameter of the ends of said fitting, and a width approximately 1.57 times the diameter of the ends of said fitting, with said flattened region being offset in relation to the ends such that the bottom surface of the flattened region is aligned with the bottom edge of the ends of the fitting and the top surface is aligned with the center of each end of the fitting.

2. A pipe fitting according to claim 1, further characterized by the flattened region having a minimum length equal to the width of said flattened region.